March 6, 1956 — W. R. EAMES — 2,737,196

FLOW DIVIDER VALVE

Filed June 4, 1952

INVENTOR.
WALTER R. EAMES

United States Patent Office 2,737,196
Patented Mar. 6, 1956

2,737,196

FLOW DIVIDER VALVE

Walter R. Eames, Hazel Park, Mich., assignor to Eaton Manufacturing Company, Cleveland, Ohio, a corporation of Ohio Application June 4, 1952, Serial No. 291,727

4 Claims. (Cl. 137—101)

This invention relates to flow control valves for use in fluid distribution systems, and particularly for use in fluid distribution systems of the kind in which hydraulic pressure fluid is divided between two branch systems such that hydraulic pressure fluid being supplied by a single pump can be used for operating fluid pressure responsive motors or the like located in the respective branch systems.

Such a flow control valve can be used in various kinds of fluid distribution systems, but is particularly useful in the hydraulic distribution systems of motor vehicles in which it serves as a flow divider valve for distributing the pressure liquid delivery of a pump between two branch systems containing certain auxiliary or servomotor devices, as for example, between one branch system containing a steering motor and a second branch system containing one or more other auxiliary hydraulic devices, such as a hydraulic lift device, hydraulically operated vehicle brakes or other such hydraulic devices.

An object of the invention is to provide a novel flow divider valve which is of a very simple, economical and reliable construction and which will be entirely automatic in its operation.

Another object is to provide a novel flow divider valve in which movable plunger means controlling the fluid distribution has an orifice therein defining a permanently open restricted passage, and in which movement of the plunger means is responsive to a fluid pressure differential across the orifice.

Still another object is to provide a novel flow divider valve of the type indicated above embodying a valve housing having a pressure fluid inlet adapted to be supplied by a pump and a plurality of outlets with which the branch distribution systems are connected and in which a valve plunger, movable in the valve housing, controls one of the outlets and has a permanently open restricted orifice therein through which the other of the outlets is continuously connected with the inlet, and wherein the movement of the valve plunger is responsive to the pressure differential across the orifice.

A further object is to provide a novel flow divider valve of the character mentioned, which also embodies a fluid pressure relief valve means.

Yet another object is to provide a novel flow divider valve of the kind referred to in which the movable valve means comprises a unit formed by a hollow valve member and inner plunger movable in the hollow valve member as a pressure relief valve member, and in which the inner valve plunger has a permanently open orifice therein defining a restricted flow passage.

The invention can be further briefly summarized as consisting in certain novel combinations and arrangements of parts hereinafter described and particularly set out in the claims hereof.

Figure 1:
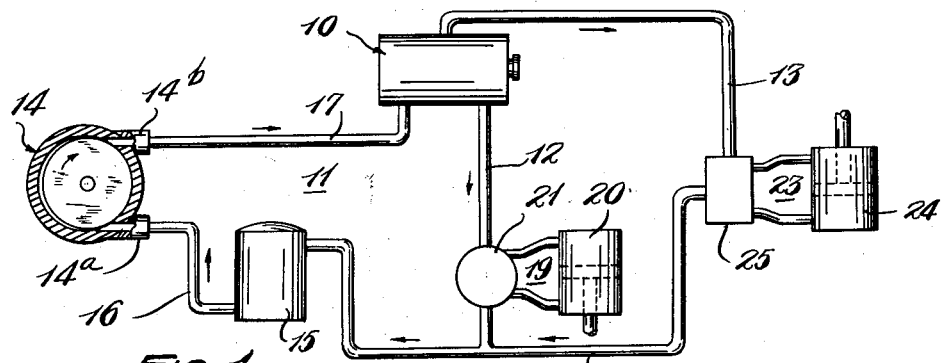
Fig. 1 is a diagrammatic view showing the novel flow divider valve used in a hydraulic distribution system and controlling the supply of pressure fluid to a plurality of branch systems.

As illustrating one practical application of this invention, Fig. 1 of the drawings shows the novel flow divider valve 10 being used in a hydraulic distribution system 11 of the kind employed on automobiles and other motor vehicles and which includes two branch systems 12 and 13. The distribution system 11 is here shown as embodying a pump 14 as the source of hydraulic pressure fluid and which may have a delivery capacity of twenty gallons per minute. The intake $14^a$ of the pump is connected with a reservoir 15 by the conduit 16. The pump discharge $14^b$ is connected with the flow divider valve 10 by the conduit 17. A return conduit 18 returns hydraulic fluid to the reservoir 15 from the branch systems 12 and 13.

The branch distribution system 12 is here shown as serving a hydraulic steering mechanism 19 comprising a motor 20 and its associated control valve 21, and can be regarded as the more favored one of the branch systems. This steering mechanism is of a construction known in the art in which the control valve 21 is of the so-called "open-center" type and is characterized by the fact that hydraulic pressure fluid is supplied continuously to the control valve through the branch system 12 in which this valve is located. Steering mechanisms of this kind have been designed which will operate satisfactorily when the hydraulic pressure fluid is supplied to the branch system 12 at a rate which is substantially continuous or which varies within relatively narrow limits, for example, a rate ranging from approximately one and one-half gallons per minute at 500 pounds per square inch pressure when the vehicle engine is running at idling speed and approximately three gallons per minute at approximately 800 pounds per square inch pressure when the vehicle engine is running at a speed of approximately 1650 revolutions per minute.

The branch system 13 can be regarded as the less favored one of the two branch systems and is here shown as serving a hydraulic lift device 23 comprising a double acting hydraulic cylinder 24 and its associated control valve 25 which is also of the open-center type. The lift device 23 can be designed for satisfactory operation when supplied with hydraulic pressure fluid at pressure values from 500 to 800 pounds per square inch and since the delivery capacity of the pump 14 is approximately twenty gallons per minute, a substantial volume of hydraulic fluid in excess of the requirements of the steering mechanism 19, will always be available for operating this lift device.

The flow divider valve 10 comprises in general a housing 27 having a bore 28 extending thereinto from one end and defining therein a valve chamber 29, and a valve member 30 operable in such bore and dividing the valve chamber into inlet and outlet chambers $29^a$ and $29^b$. The valve housing 27 is provided with an inlet passage 31 with which the supply conduit 18 is connected and an outlet passage 32 with which the branch system 12 is connected. At a point intermediate the inlet and outlet passages 31 and 32, the housing 27 is provided with an outlet port 33 with which the branch system 13 is connected. The inlet and outlet passages 31 and 32 and the outlet port 33 are all in communication with the bore 28 through the wall thereof. The bore 28 is closed at its outer end as by a closure plug 34 mounted therein.

The valve member 30 includes a plunger portion 35 which is slidable in the bore 28 and controls the communication of the outlet port 33 with the valve chamber 29.

The valve member 30 also includes a reduced stem portion 36 extending axially of the chamber 29 and carrying a plunger 37 which is operable in a dashpot cylinder 38. This dashpot cylinder 38 is defined by the inner or blind end of the bore 28.

A distinctive characteristic of the valve member 30 is that it is also provided with a permanently open orifice 40 of a calibrated size defining a restricted flow control passage continuously connecting the outlet passage 32 with the inlet passage 31 through the outlet chamber portion 29ᵇ of the valve chamber 29. The orifice 40 is in communication with the inlet passage 31 through the transverse passage 41 of the reduced stem portions 36 and through the inlet chamber portion 29ᵃ of the valve chamber 29.

At its outer end, the valve member 30 is provided with a counterbore 42 forming a seat for a compression spring 43 which is disposed between the valve member and the closure plug 34. The spring 43 is effective on the valve member 30 and urges the same toward the initial position shown in Fig. 2 in which the plunger portion 35 overlies and closes the outlet port 33.

The valve member 30 is constructed so that the effective areas of the opposite end portions thereof, which are subjected to the pressures of the hydraulic fluid in the inlet and outlet passages 31 and 32, are substantially equal. The cross-sectional area of the flow control orifice 40 and the pressure of the spring 43 are so selected, in relation to the volume and pressure values of the hydraulic fluid delivered by the pump 14, that the desired volume of one and one-half to three gallons per minute of hydraulic pressure fluid will always be available in the branch system 12 for operation of the steering mechanism 19.

Figure 2:
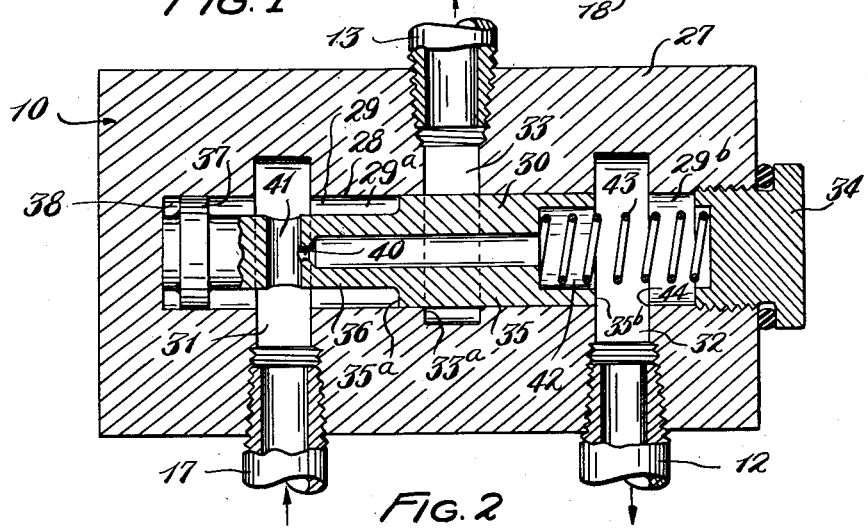
Fig. 2 is a longitudinal section taken through the flow divider valve.

With the construction just described above for the flow divider valve 10, it will be seen that the outlet passage 12 is in continuously connected restricted communication with the inlet passage 31 through the permanently open orifice 40. Just prior to the starting of the pump 14, the valve member 30 will occupy the initial position in which it is being held by the compression spring 43, as shown in Fig. 2, and in which position the outlet port 33 is closed by the plunger portion 35. When the pump 14 is started and its speed of operation increases, hydraulic pressure fluid will be delivered therefrom into the valve chamber 29 through the inlet passage 31. Some of this fluid will pass directly through the orifice 40 and will be supplied to the branch system 12 through the outlet passage 32.

The pressure fluid which is in the inlet passage 31 and the inlet chamber 29ᵃ can be referred to as being upstream relative to the orifice 40 and the pressure fluid in the outlet chamber 29ᵇ and the outlet passage 32 can be referred to as being on the downstream side of the orifice 40. The pressure of the fluid on the upstream side of the orifice 40 is greater than the pressure of the fluid on the downstream side of the orifice and the difference between these pressures is referred to as the pressure differential across the orifice.

In accordance with a known law of physics, this differential pressure varies with the rate of flow through the orifice 40, such that the greater the flow of fluid through the orifice, the greater the differential pressure will be. Since the effective areas of the end portions of the valve member 30 are substantially equal, as mentioned above, the forces acting on this valve member will be substantially balanced except for the force of the compression spring 43 and the pressure differential across the orifice 40.

When the speed of the pump 14 increases with an increase in engine speed, the pressure of the upstream fluid in the inlet chamber 29ᵃ will increase and will produce a small increase in the rate of flow through the orifice 40 and the pressure differential across the orifice will, likewise, increase. The resultant effect of the increased pressure of the upstream fluid will be to produce a movement of the valve member 30 toward the right against the action of the spring 43 causing the end 35ᵃ of the plunger portion 35 to move past the point 33ᵃ and partially uncover the outlet port 33, thereby permitting the portion of the pump discharge which is in excess of the one and one-half to three gallons per minute requirements of the branch system 12, to be discharged through the outlet port 33 into the branch system 13 where it will be available for actuation of the lift device 23. Thus the size of the orifice 40 and the force of the spring 43 in relation to each other determine the amount of fluid which will be delivered continuously into the branch system 12 while the remainder or excess fluid is delivered into the branch system 13.

Let it be assumed now that a demand for pressure occurs in the branch system 13 for operating the lift mechanism 23 while the branch system 12 is at free flow, that is to say, while the steering mechanism 19 is idle. At this time the pressure supplied to the inlet passage 31 by the pump 14 will cause the valve member 30 to be moved toward the right until the end 35ᵇ approaches the point 44, whereupon the flow of fluid into the branch system 12 is decreased by a restricting of the outlet passage 32. This restricting of the outlet passage 32 will continue until a balanced condition occurs in which the pump discharge pressure in the inlet chamber 29ᵃ and the pressure in the outlet chamber 29ᵇ are substantially equal. While this condition exists, the desired flow of at least one and one-half gallons per minute will continue into the branch system 12 but, by reason of the restricting action of the end 35ᵇ of the valve member 35 at the point 44, the pressure in the inlet passage 31 will build up sufficiently to balance the pressure demand occurring in the branch system 13.

In the event that a demand occurs for operating pressure in both of the branch systems 12 and 13 simultaneously, the valve member 30 will operate such that its ends 35ᵃ and 35ᵇ will produce a restriction either at the point 33ᵃ of the outlet port 33 or at the point 44 of the outlet passage 32, depending on which branch system has the lower pressure demand placed thereon.

Figure 3:
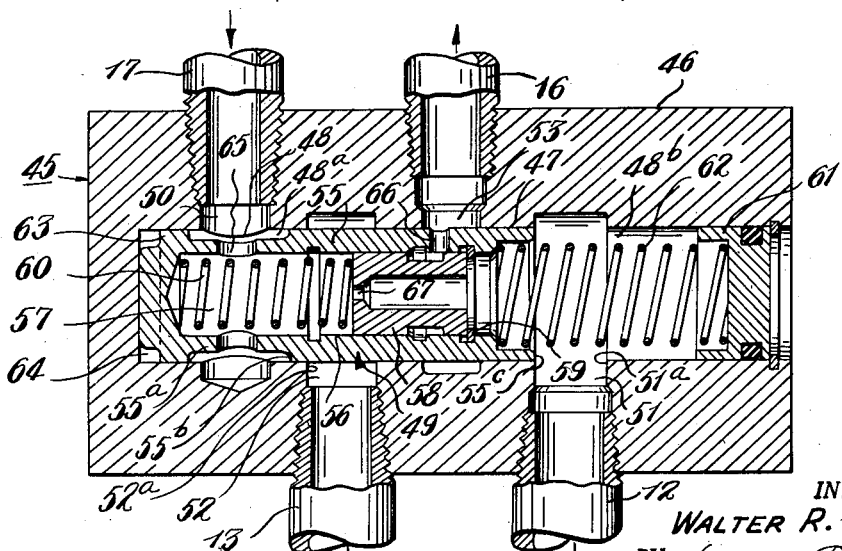
Fig. 3 is a longitudinal section taken through a modified form of the flow divider valve.

In Fig. 3 of the drawings, a flow divider valve 45 is shown which represents a modified construction. The flow divider valve 45 comprises a housing 46 having an axial bore 47 therein defining a valve chamber 48, and a valve unit 49 operable in such bore and dividing the chamber 48 into inlet and outlet chambers 48ᵃ and 48ᵇ. The housing 46 is provided at axially spaced points thereof with inlet and outlet passages 50 and 51 which communicate with the bore through the wall thereof. The inlet passage 50 is connected with the pump discharge by a conduit 17 and the outlet passage 51 is connected with a branch system 12, such as that described above and containing a steering mechanism.

At points intermediate the inlet and outlet passages 50 and 51, the housing 46 is provided with an outlet port 52 and a relief port 53 which are also in communication with the bore 47 through the wall thereof. The outlet port 52 is connected with the branch system 13 so as to serve an auxiliary hydraulic device, such as the lift device 23 described above. The relief port 53 is connected with the intake or suction side of the pump 14 by means of the conduit 16.

The valve unit 49 comprises a hollow valve member 55 having an axial inner bore 56 therein defining an inner valve chamber 57, and an inner valve member 58 in the form of a plunger slidable in such inner bore. The valve unit 49 also comprises a stop, in the form of an internal snap ring 59 carried by the hollow valve member 55 and engaged by the outer end of the inner valve member 58, and a compression spring 60 located in the inner chamber 57 and acting on the inner valve member 58 to urge the latter toward engagement with the stop 59.

The outer end of the bore 47 of the valve housing 46 is closed by a closure plug 61. This plug also forms a seat for a compression spring 62 which is disposed between the plug and the adjacent end of the valve unit 49. The inner end of the hollow valve member 55 is in the form of a reduced stem portion 55ª extending axially of the valve chamber 48 and carrying a plunger 63 which is operable in a dashpot cylinder 64.

The inner chamber 57 of the valve unit 49 is in open communication with the inlet passage 50 through radial openings 65 of the hollow valve member 55 and through the inlet portion 48ª of the valve chamber 48. A radial relief port 66, also extending through the wall of the hollow valve member 55, is continuously in communication with relief passage 53, but is normally closed by the inner valve member 58.

An important characteristic of the flow divider valve 45 is that the inner valve member 58 is provided with a permanently open flow control orifice 67 which defines a restricted passage continuously connecting the outlet passage 51 with the inlet passage 50 through the outlet chamber portion 48ᵇ of the valve chamber 48. The valve unit 49 is so constructed that the effective areas of the opposite ends thereof are substantially equal. The cross-sectional area of the orifice 67 and the pressure values of the springs 60 and 62, are such that the forces normally acting on the valve unit 49 will be substantially balanced except for the pressure of the spring 62 and the pressure differential across the orifice 67.

When the pressure of the upstream fluid being supplied by the pump increases, the pressure differential across the orifice 67 will, likewise, increase and will cause the valve unit 49 to be shifted toward the right against the force of the spring 62 thereby causing the end portion 55ᵇ of the hollow valve member 55 to move past the point 52ª and uncover the outlet port 52. This permits pressure fluid to be supplied to the branch system 13 where it will be available for operating the lift device 23. During a demand for pressure in the branch system 13, the valve unit 49 will be shifted toward the right and the end 55ᶜ of the valve member 55 will approach the point 51ª to partially restrict the outlet passage 51 in the same manner as has been described above for the divider valve 10.

Whenever the pressure of the fluid in the outlet passage 51 increases above a desired or permissible value for the branch system 12, fluid will be discharged from the outlet chamber 48ᵇ into the relief port 53 from which it is returned by the conduit 16 to the intake or suction side of the pump. During this by-pass function of the flow divider valve device 45, the fluid pressure in the outlet chamber 48ᵇ acts on the right hand end of the inner valve member 58 in opposition to the compression spring 60. When this fluid pressure is sufficient to overcome the spring 60, it shifts the inner valve member 58 toward the left causing this valve member to uncover the connecting port 66, such that the outlet port 53 will be connected directly with the outlet chamber 48ᵇ. The valve member 58 will, therefore, function as a relief valve by which excess pressure fluid in the outlet chamber 48ᵇ will be by-passed to the intake side of the pump to thereby prevent the pressure in the outlet passage 51 and in the branch system 12 from exceeding a desired substantially constant value.

From the foregoing description and the accompanying drawings, it will now be readily understood that this invention provides a novel form of flow divider valve device by which hydraulic fluid being delivered by a pump will be supplied to two branch hydraulic systems containing fluid pressure responsive motors or auxiliary devices to be actuated, and in which the division of the hydraulic pressure fluid will be such that a continuous supply of the hydraulic fluid at a substantially constant rate will be assured for one of the branch systems and the hydraulic fluid in excess of that required by such one branch system, will be supplied to a second branch system for use therein for producing a desired actuation of one or more other auxiliary devices. Additionally, it will be seen that the provision of a permanently open orifice in the movable valve means of this novel flow divider valve permits the desired flow of fluid directly into a more favored one of the branch systems and the pressure differential across the orifice is utilized to actuate the valve means for controlling the flow of pressure fluid to another and less favored one of the branch systems. It will, likewise, be seen that this invention also provides a relief valve member which is responsive to the pressure in one of the branch systems for discharging excess pressure fluid from the divider valve for return to the suction side of the pump through a by-pass connection.

Although the novel flow divider valve device of this invention has been illustrated and undescribed herein to a somewhat detailed extent, it will be understood, of course, that the invention is not to be regarded as being limited correspondingly in scope, but includes all changes and modifications coming within the terms of the claims hereof.

Having thus described my invention I claim:

1. A flow divider valve device comprising, a housing having a bore therein and pressure fluid inlet and outlet passages continuously in communication with said bore at axially spaced points thereof, said housing also having first and second outlet ports in the wall of said bore at axially spaced points between said inlet and outlet passages, and plunger means in said bore controlling said first and second outlet ports, said plunger means having a permanently open but restricted orifice therein continuously connecting said outlet passage with said inlet passage, the movement of said plunger means in controlling said outlet ports being responsive to the pressure differential across said orifice such that predominating fluid pressure in said inlet passage causes plunger movement in a direction to open said first outlet port for the discharge of fluid through the latter from said inlet passage and predominating fluid pressure in said outlet passage causes plunger movement in a direction to open said second outlet port for the discharge of fluid through the latter from said outlet passage.

2. A flow divider valve device comprising, a housing having a bore therein and pressure fluid inlet and outlet passages opening through the wall of said bore at axially spaced points thereof, said housing also having first and second outlet ports in the wall of said bore at axially spaced points between said inlet and outlet passages, a hollow valve member defining an inner valve chamber and being slidable in said bore and having a plunger portion controlling said first outlet port, said hollow valve member having a connecting passage connecting said inner valve chamber with said inlet passage and a connecting port communicating with said second outlet port, an inner plunger movable in said hollow valve member and controlling said connecting port, a stop on said hollow valve member located to be engaged by said inner plunger when said connecting port is closed by the latter, a first spring in said hollow valve member urging said inner plunger toward said stop, said hollow valve member and said inner plunger forming a valve unit dividing said bore into inlet and outlet chambers with which said inlet and outlet passages are connected, said valve unit having end portions of substantially equal effective areas exposed to the pressures of the fluid of said inlet and outlet chambers, said inner plunger having an orifice therein defining a permanently open restricted passage continuously connecting said outlet chamber with said inlet chamber through said inner valve chamber and said connecting passage, and a second spring effective on said valve unit and urging the same in a direction to cause said plunger portion to close said first outlet port, the movement of said valve unit in said bore being responsive to the resultant of the force of said second spring and the pressure differential between said fluid pressures of said inlet and outlet chambers and the movement of said inner plunger in said hollow valve member being responsive to the resultant of the force of said first spring and the pressure of the fluid in said outlet chamber.

3. A flow divider valve device comprising, a housing having a bore therein and pressure fluid inlet and outlet passages continuously in communication with said bore at axially spaced points thereof, said housing also having first and second outlet ports in the wall of said bore at axially spaced points between said inlet and outlet passages, plunger means in said bore and having a permanently open but restricted orifice therein continuously connecting said outlet passage with said inlet passage, and first and second springs engaging said plunger means with said first spring tending to produce plunger movement in one direction and said second spring tending to produce plunger movement in the opposite direction, said first and second outlet ports being controlled by said plunger means such that said first outlet port is opened by automatic plunger movement in said one direction in response to pressure of fluid in said inlet passage of a value to overcome said second spring and said second outlet port is opened by automatic plunger movement in said opposite direction in response to pressure of fluid in said outlet passage of a value to overcome said first spring.

4. A flow divider valve device comprising, a housing having a bore and pressure fluid inlet and outlet passages spaced apart axially of said bore, said housing also having at least one outlet port in the wall of said bore at a point between said inlet and outlet passages, plunger means slidable in said bore and having a portion of relatively reduced size defining with the wall of said bore a fluid pressure inlet chamber adjacent one end of said plunger means, a portion of said bore adjacent the other end of said plunger means defining an outlet chamber, said inlet passage being continuously in communication with said inlet chamber and said outlet passage being continuously in communication with said outlet chamber, said plunger means having an orifice therein forming a permanently open restricted connection between said inlet chamber and said outlet chamber, said plunger means also having a constant-area pressure receiving surface thereon which is at all times exposed to the fluid pressure in said inlet chamber and which is movable to a position in said bore to permit communication between said inlet chamber and said outlet port, and spring means effective on said plunger in opposition to inlet chamber pressure thereon, said outlet port being controlled by automatic movement of said plunger in said bore in response to the fluid pressure differential across said orifice and in response to the resultant of the forces applied to said plunger by said spring means and said inlet chamber pressure, said bore having at the inlet passage end thereof a blind end portion defining a dashpot cylinder and said relatively reduced portion of said plunger means having thereon a dashpot plunger which operates in said dashpot cylinder.

References Cited in the file of this patent
UNITED STATES PATENTS

| 1,993,790 | Kinsella | Mar. 12, 1935 |
| 2,242,002 | Klein | May 13, 1941 |
| 2,291,229 | Johnson | July 28, 1942 |
| 2,413,896 | Trautman et al. | Jan. 7, 1947 |
| 2,593,185 | Renick | Apr. 15, 1952 |
| 2,624,361 | Brown | Jan. 6, 1953 |
| 2,649,980 | Slomer | Aug. 25, 1953 |

FOREIGN PATENTS

| 589,095 | Great Britain | June 11, 1947 |